United States Patent [19]

Galvin

[11] 4,427,888
[45] Jan. 24, 1984

[54] INFRARED IMAGING SYSTEM

[75] Inventor: Aaron A. Galvin, Lexington, Mass.

[73] Assignee: American District Telegraph Company, New York, N.Y.

[21] Appl. No.: 291,492

[22] Filed: Aug. 10, 1981

[51] Int. Cl.³ .......................... H01J 31/49; H01J 31/50
[52] U.S. Cl. ..................................... 250/331; 350/351; 250/330
[58] Field of Search ................ 350/351; 250/330, 331, 250/333

[56] References Cited

U.S. PATENT DOCUMENTS

| | | | |
|---|---|---|---|
| 3,423,051 | 1/1969 | Jakab | 250/330 X |
| 3,454,773 | 7/1969 | Bulthius et al. | 250/333 X |
| 3,569,709 | 3/1971 | Wank | 250/331 |
| 3,600,060 | 8/1971 | Churchill et al. | 350/351 X |
| 3,730,985 | 5/1973 | Whitney | 250/333 X |
| 3,770,961 | 11/1973 | Westell | 350/351 X |
| 3,866,045 | 2/1975 | Ely et al. | 250/331 |
| 4,040,744 | 8/1971 | Schertz et al. | 250/330 X |
| 4,266,129 | 5/1981 | Versteeg et al. | 250/330 |

Primary Examiner—Bruce Y. Arnold
Assistant Examiner—Richard F. Gallivan
Attorney, Agent, or Firm—Weingarten, Schurgin, Gagnebin & Hayes

[57] ABSTRACT

An infrared imaging system is disclosed which provides a two-dimensional visible image of the temperature profile of a radiating infrared source remotely located from the system. The invention is preferably implemented as a small hand-held instrument which can be held at a user's eye for sighting at a source of radiation and for viewing the temperature profile thereof. The system comprises an objective lens operative to focus an infrared image of a radiating source onto a surface of a liquid crystal structure, with the opposite surface of the structure being visually viewable by way of an eyepiece. The liquid crystal structure is biased preferably by a closed loop temperature control to be sensitive to an intended infrared spectrum of interest and to be substantially non-responsive to ambient temperatures.

12 Claims, 3 Drawing Figures

INFRARED IMAGING SYSTEM

FIELD OF THE INVENTION

This invention relates to infrared detection systems and more particularly to a passive infrared imaging system for sensing the infrared radiation provided by a source and providing a visible image of the sensed radiation.

BACKGROUND OF THE INVENTION

Infrared detection systems are known for sensing infrared radiation from a radiating object or source and for providing an indication of sensed temperature or a display of temperature profile. Many infrared detection instruments are in the nature of non-contacting thermometers for providing measurement of radiation from a single localized area at which the instrument is aimed. Such instruments generally employ an infrared detecting element which provides an electrical signal in response to received radiation and which signal is processed by associated electronic circuitry to provide an output indication of sensed temperature. Systems are also known in which electronic or mechanical scanners are employed to produce a two-dimensional display of sensed radiation and which display is provided typically on a cathode ray tube screen or on a pen recorder. These systems also require active electronic circuitry and an active sensing instrumentality such as an image tube or a sensor element and associated scanner. As a consequence, such known systems are relatively expensive and complex.

Liquid crystal materials are also known for providing a visual representation of temperature in the form of colors which correspond to sensed temperatures. In general, such liquid crystal materials are applied either in film form or as a coating to a radiating surface for direct sensing of surface temperature and to exhibit by virtue of color changes the surface temperature profile.

SUMMARY OF THE INVENTION

In accordance with this invention, an infrared imaging system is provided in which a two-dimensional visible image is provided of a radiating source remotely located from the system. The invention is preferably implemented as a hand-held instrument which can be held at eye level for sighting of a radiating source and viewing of the temperature profile thereof. The system includes an objective lens operative to focus an infrared image of a radiating source or object onto a surface of a liquid crystal structure, with the opposite surface of the structure being visually viewable by way of an eyepiece lens. The liquid crystal provides varying colors corresponding to the temperature that is reached by various portions of the crystal material in response to received radiation from an infrared source. The visually perceivable color pattern is representative to the temperature profile of the infrared source. Such a profile is provided without any contact with the radiating object, and by passive apparatus which is relatively simple to construct and to operate.

The liquid crystal material is biased by a heater to a temperature above the ambient temperature and just below the temperature at which its color changes from black to red. The liquid crystal thus responds primarily to the infrared radiation impinging on it and not to ambient temperature. Preferably the liquid crystal is part of a laminated structure or sandwich which includes a transparent electrical heater film over the liquid crystal layer, and facing the eyepiece lens. An absorbtive backing is provided on the other surface of the liquid crystal layer to absorb radiant energy imaged thereon by the objective lens. The heater can be controlled in a closed servo loop in which power is applied to the heater of a magnitude sufficient to maintain the temperature of the liquid crystal sheet at its intended transition state as sensed by light reflected from the liquid crystal surface and from which a heater control signal is derived. In an alternative embodiment, a visual image of the object being observed can be superimposed upon the infrared image viewed on the liquid crystal sheet.

DESCRIPTION OF THE DRAWINGS

The invention will be more fully understood from the following detailed description taken in conjunction with the accompanying drawings in which.

DETAILED DESCRIPTION OF THE INVENTION

Figure 1:
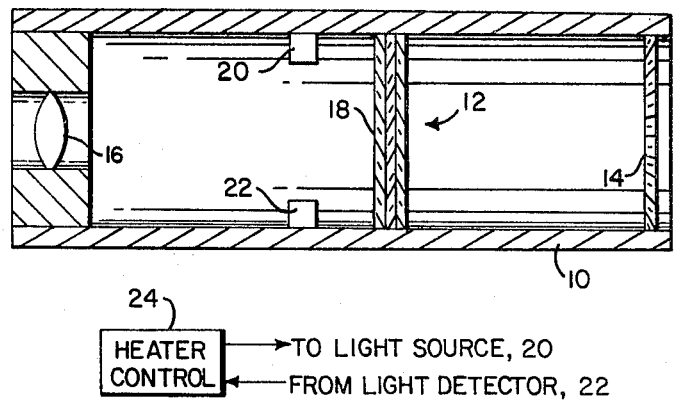
FIG. 1 is a diagrammatic representation of an infrared imaging system embodying the invention.

The invention as shown in preferred embodiment in FIG. 1 comprises a housing 10 having a liquid crystal structure 12 mounted therein, this structure being of laminated construction as will be described below. An objective lens 14 is disposed at one end of the housing 10, and an eyepiece lens 16 is disposed at the other end of the housing. The objective lens is transmissive to and operative to focus infrared radiation in an intended spectral range, typically at wavelengths of 0.7 to 10 microns. Preferably the objective lens is a Fresnal lens molded or otherwise formed in a relatively thin plastic sheet. Such Fresnel lenses are per se well known and are of considerably less cost than the more visual lenses formed of optical glass or plastic having multicurved surfaces. The eyepiece lens is operative for visual light and may be composed of one or more lens elements, in well-known manner, to provide intended optical magnification. The object lens 14 has a focal length determined to provide imaging of infrared radiation from an object being viewed onto the surface 18 of the liquid crystal structure. The eyepiece lens is of a focal length to provide intended magnification of the image produced by the liquid crystal structure as viewed through the eyepiece by a user.

A light source 20 and light detector 22 are provided within housing 10 and are part of automatic heater control apparatus 24 for biasing of the liquid crystal material to an intended operating state. The light source is operative to illuminate a portion of the confronting liquid crystal surface, while the light sensor is operative to sense light reflected from the illuminated liquid crystal surface and to provide an electrical signal to the heater control which is operative in a manner to be described.

Figure 2:
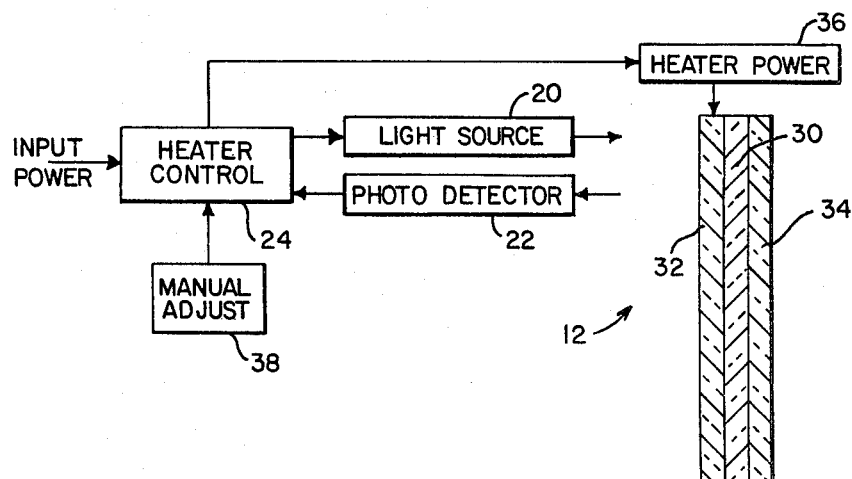
FIG. 2 is a diagrammatic representation of the liquid crystal sheet structure and associated biasing system employed in the invention.

The liquid crystal structure is shown in greater detail in FIG. 2 and is composed of a centrally disposed sheet 30 of liquid crystal material sandwiched between a transparent electrical heater layer 32 which confronts the eyepiece of the system, and an infrared radiation absorbing layer 34 which confronts the objective lens of the system. The heater control 24 provides energization of the light source 20 which illuminates a portion of the liquid crystal surface, and also provides a control signal to a heater power source 36 which provides energizing power to the heater layer 32 of a magnitude determined by the control signal. Light reflected from the liquid crystal surface at the point at which its color starts to change from black is detected by the light sensor 22 which provides a feedback signal to the control electronics for maintaining closed loop temperature control. The liquid crystal material enclosed is sensitive to temperatures above the normal ambient temperature, and is biased to a temperature level above the ambient temperature range and just below the point where its color changes from black to red. Power is applied to the heater layer 32 to raise the temperature thereof and the laminated liquid crystal sheet to an intended temperature level as determined by a manual control 38, or as may be preset in the heater control 24. Thus, the liquid crystal material is biased to respond substantially only to the impinging infrared radiation and not to ambient temperature.

The heater layer 32 can be constructed from electrically conducting glass cemented to the surface of the liquid crystal sheet 30. The liquid crystal material is an organic material known as a cholesteric ester which is bound in a Mylar or other plastic substrate. The layer 34 is typically a black paint on the surface of sheet 30 opposite heater layer 32, to provide enchanced infrared absorbtion.

In operation, a user holds the apparatus at eye level for viewing through the eyepiece, sights the apparatus at an object or source to be monitored and observes on the viewing surface of the liquid crystal structure a pattern of colors and hues representative of the temperature profile of the infrared radiation being received. It is evident that contact with the radiating source is not necessary, and the apparatus embodying the invention can be employed over varying distances from the source of radiation. With presently available liquid crystal materials, the invention is operable typically up to distances of about 50 feet.

Figure 3:
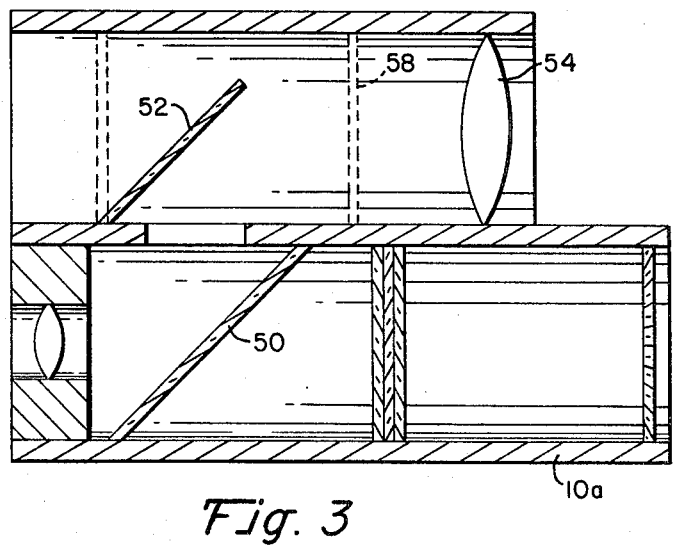
FIG. 3 is a diagrammatic representation of an alternative embodiment of the invention providing a superimposed visual image.

An alternative embodiment is shown in FIG. 3 and by which a visual image is superimposed on the radiation image provided by the liquid crystal structure. The housing 10a includes the liquid crystal structure, objective lens, and eyepiece lens as in the embodiment described above, and in addition includes a half silvered mirror 50 disposed at a 45° angle as illustrated between the eyepiece lens and the liquid crystal structure. A mirror 52 is disposed in an upper portion of the housing also at a 45° orientation as illustrated. An objective lens 54 is provided at the forward end of the upper housing portion and operative to refract visual light. The optical channel is constructed to provide a visual image of the object being viewed of substantially the same size as the radiation image viewed on the liquid crystal sheet and in substantial superimposition therewith, by providing focal lengths and internal optical path lengths for both objectives which are the same. In employing this embodiment, a user will see a visible image of an object being viewed, with a variably colored pattern superimposed on the viewed object representative of the temperature profile of the object. The superimposed optical image can be eliminated selectively by occlusion of the optical path, such as by moving the mirror 52 to a secondary position, shown in dotted form in FIG. 3, or by covering the objective lens 54. As a variation of the embodiment of FIG. 3, a translucent screen 58 can be provided between the mirror 52 and the objective lens 54 and onto which the optical image of the object being viewed is focused. The optical image on the translucent screen is viewed by means of the eyepiece lens and associated mirrors. The position of the translucent screen and the optical path are again determined to provide a superimposed image of substantially equal size as the radiation image provided by the liquid crystal sheet.

The invention is not to be limited by what has been particularly shown and described except as illustrated in the appended claims.

What is claimed is:

1. An infrared imaging system comprising:
   a liquid crystal structure having a surface for absorbing infrared radiation from a radiating object, and a viewing surface for providing an image representative of the temperature profile of received infrared radiation;
   means for biasing the liquid crystal material to a temperature level above the ambient temperature range and just below the temperature at which the color of the liquid crystal material changes from black;
   an objective lens disposed in spaced relationship with the radiation absorbing surface of said structure and operative to image infrared radiation from an object being viewed onto said absorbing surface;
   an eyepiece lens disposed in spaced relationship with the viewing surface of said structure and operative to provide to a user a magnified version of the image provided thereon; and
   a visual channel providing a visual image of an object being viewed in superposition with the infrared temperature profile thereof, said visual channel including an objective lens operative to provide a visual image of the object being viewed and means for coupling the visual image to said eyepiece lens for the viewing of the visual image in superposition with the infrared temperature profile thereof.

2. The system of claim 1 wherein said biasing means includes:
   a transparent electrical heater film disposed over the liquid crystal structure and operative to heat the liquid crystal material to said temperature level above the ambient temperature range and below the temperature at which the color of the liquid crystal material changes from black.

3. The system of claim 2 wherein said biasing means includes a light source operative to illuminate a portion of the viewing surface;
   a light detector operative to provide an electrical signal representative of light reflected from the viewing surface; and
   a control circuit operative in response to the signal from the light sensor to provide a power signal to the heater film to maintain the liquid crystal material at the intended temperature level.

4. The system of claim 1 wherein said liquid crystal structure is operative to provide as an image a color pattern representative of the temperature profile of received infrared radiation.

5. The system of claim 1 wherein said objective lens is a Fresnel lens.

6. The system of claim 1 wherein said liquid crystal structure includes an infrared radiation absorbing layer confronting received infrared radiation.

7. The system of claim 1 including a housing having said objective lens on one end thereof, said eyepiece lens on the other end thereof, and wherein said liquid crystal structure and biasing means are disposed within the housing between the objective and eyepiece lenses.

8. An infrared imaging system comprising:
a liquid crystal structure having a surface for absorbing infrared radiation from a radiating object, and a viewing surface for providing an image representative of the temperature profile of received infrared radiation, said liquid crystal structure including a multi-layer structure including a sheet of liquid crystal material, a transparent electrical heater layer confronting the eyepiece lens, and an infrared radiation absorbing layer adapted to confront an objective lens;
means including said electrical heating layer for biasing the liquid crystal material to a temperature level above the ambient temperature range and just below the temperature at which the color of the liquid crystal material changes from black;
an objective lens disposed in spaced relationship with the radiation absorbing layer and operative to image infrared radiation from an object being viewed onto said absorbing layer; and
an eyepiece lens disposed in spaced relationship with the viewing surface of said structure and operative to provide to a user, a magnified version of the image provided thereon.

9. An infrared imaging system comprising:
a liquid crystal structure having a surface for absorbing infrared radiation from a radiating object, and a viewing surface for providing an image representative of the temperature profile of received infrared radiation;
means for biasing the liquid crystal material to a temperature level above the ambient temperature range and just below the temperature at which the color of the liquid crystal material changes from black;
an objective lens disposed in spaced relationship with the radiation absorbing surface of said structure and operative to image infrared radiation from an object being viewed onto said absorbing surface;
an eyepiece lens disposed in spaced relationship with the viewing surface of said structure and operative to provide to a user, a magnified version of the image provided thereon; and
a visual channel providing a visual image of an object being viewed in superposition with the infrared temperature profile thereof, said visual channel including an objective lens operative to provide a visual image of the object being viewed and means for coupling the visual image to said eyepiece lens for the viewing of the visual image in superposition with the infrared temperature profile thereof, said visual channel including mirror means for coupling the visual image to said eyepiece lens for viewing of the visual image in superimposition with the temperature profile of said object.

10. The system of claim 9 wherein said mirror means includes a half-silvered mirror disposed between the eyepiece lens and the liquid crystal structure and operative to permit viewing therethrough of the infrared image of the viewing surface of the liquid crystal structure and to reflect the visual image to the eyepiece lens.

11. The system of claim 9 wherein said visual channel includes means for occluding the visual channel to selectively eliminate the visual image.

12. An infrared imaging system comprising:
a liquid crystal structure having a surface for absorbing infrared radiation from a radiating object, and a viewing surface for providing an image representative of the temperature profile of received infrared radiation;
means for biasing the liquid crystal material to a temperature level above the ambient temperature range and just below the temperature at which the color of the liquid crystal material changes from black;
an objective lens disposed in spaced relationship with the radiation absorbing surface of said structure and operative to image infrared radiation from an object being viewed onto said absorbing surface;
an eyepiece lens disposed in spaced relationship with the viewing surface of said structure and operative to provide to a user, a magnified version of the image provided thereon; and
a visual channel providing a visual image of an object being viewed in superposition with the infrared temperature profile thereof, said visual channel including an objective lens operative to provide a visual image of the object being viewed and means for coupling the visual image to said eyepiece lens for the viewing of the visual image in superposition with the infrared temperature profile thereof, said visual channel including a translucent screen onto which the visual image is formed by the visual channel objective lens; and
mirror means for coupling the visual image from the translucent screen to said eyepiece lens for viewing of the visual image in superimposition with the temperature profile of said object.

* * * * *